United States Patent [19]
Weil et al.

[11] Patent Number: 4,952,646
[45] Date of Patent: Aug. 28, 1990

[54] EPOXY RESIN COMPOSITIONS CONTAINING A POLYPHOSPHORIC/POLYPHOSPHONIC ANHYDRIDE CURING AGENT

[75] Inventors: Edward D. Weil, Hastings-on-Hudson; John Tomko, Dobbs Ferry; Fred Jaffe, Ossining, all of N.Y.

[73] Assignee: Akzo America Inc., New York, N.Y.

[21] Appl. No.: 382,360

[22] Filed: Jul. 20, 1989

[51] Int. Cl.⁵ ............................................. C08G 59/40
[52] U.S. Cl. .................................... 525/507; 528/108; 528/361; 528/398
[58] Field of Search ................. 525/507; 528/108, 361, 528/398

[56] References Cited

U.S. PATENT DOCUMENTS

| 3,245,940 | 4/1966 | Ronay et al. | 528/108 X |
| 3,454,683 | 7/1969 | Kampe et al. | 260/988 |
| 3,454,684 | 7/1969 | Kampe et al. | 260/988 |
| 3,637,591 | 1/1972 | Coran | 528/108 X |
| 4,316,006 | 2/1982 | McEwen | 528/108 X |
| 4,613,661 | 9/1986 | Langer et al. | 528/108 |
| 4,820,784 | 4/1989 | Massingill et al. | 528/108 X |
| 4,853,455 | 8/1989 | Schneider et al. | 528/108 |

FOREIGN PATENT DOCUMENTS

| 58-173149 | 10/1983 | Japan . |
| 62-250026 | 10/1987 | Japan . |
| 1000891 | 4/1967 | U.S.S.R. . |
| 455129 | 3/1975 | U.S.S.R. . |
| 1064610 | 5/1967 | United Kingdom . |

*Primary Examiner*—Earl Nielsen
*Attorney, Agent, or Firm*—Richard P. Fennelly; Louis A. Morris

[57] ABSTRACT

Epoxy resins can be cured by the use of a curing agent formed by the reaction of phosphorus pentoxide with a trialkyl phosphate or phosphonate.

8 Claims, No Drawings

EPOXY RESIN COMPOSITIONS CONTAINING A POLYPHOSPHORIC/POLYPHOSPHONIC ANHYDRIDE CURING AGENT

BACKGROUND OF THE INVENTION

1. Field of the Invention

The present invention relates to epoxy resin compositions containing a polyphosphoric/polyphosphonic anhydride curing agent. As used herein, the term "polyphosphoric/polyphosphonic anhydride" is intended to encompass those polymeric anhydrides formed by reaction of phosphorus pentoxide with neutral phosphate esters and neutral phosphonate esters.

2. Description of the Prior Art

U.S. Pat. Nos. 3,454,683 and 3,454,684 and British Patent No. 1,064,610 describe the preparation of neutral polyphosphoric anhydride compositions by reacting phosphorus pentoxide with one or more phosphorus compounds (e.g., trialkyl phosphates or phosphonates). The polyphosphoric anhydrides are described as useful as catalysts in proton-catalyzed reactions or as intermediate products in the manufacture of insecticides.

There are certain disclosures in the prior art of using phosphorus-containing compounds in epoxy resin compositions.

Japanese Patent Publication No. 58 173,149 teaches epoxy resin compositions using phosphate, phosphite or polyphosphate additives as moisture or corrosion inhibitors. This reference indicates that the compositions consist essentially of epoxy resin, hardener, inorganic filler, and corrosion or moisture resistance additive. The additional mention of a hardener, in addition to the phosphate, phosphite or polyphosphate additive, indicates that such phosphorus-containing additives were not deemed to be curing agents for the epoxy composition. The phosphorus-containing additives actually tested did not include neutral polyphosphoric anhydride compositions.

U.S.S.R. Patent No. 455,129 indicates that the mechanical and physical properties of epoxy resin compositions and its resistance to fire can be improved when mono-, di-, or tri-alkylophosphines are used as hardeners in amounts of from about 10–25% by weight.

U.S.S.R. Patent No. 1,000,891 teaches the use of a phosphorus-containing polyester as an epoxy resin hardener. A representative example of such a phosphorus-containing material is polypentamethylene phosphite which is obtained by the polyesterification of dimethyl phosphoric acid with hexane diol.

Japanese Patent Publication No. 62 250 026 shows certain low room temperature curable epoxy resin compositions which contain a silyl phosphate ester or silyl polyphosphate ester material as a hardener and crosslinking agent.

SUMMARY OF THE PRESENT INVENTION

The present invention resides in the use of a polyphosphoric/polyphosphonic anhydride curing agent in an epoxy resin.

DETAILED DESCRIPTION OF THE PRESENT INVENTION

The aforementioned U.S. Pat. Nos. 3,454,683 and 3,454,684 and British Patent No. 1,064,610 should be consulted in regard to processes wherein certain of the curing agents of the present invention might be synthesized. These patents are incorporated herein by reference in regard to such a teaching. Briefly stated, the materials can be formed by reacting phosphorus pentoxide with a phosphorus compound or mixture of phosphorus compounds as shown in those patents.

The polyphosphoric/polyphosphonic anhydride materials intended for use as curing agents herein may be represented by the structure

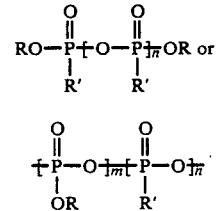

where R' can be alkyl, aryl, alkoxy, aryloxy, with the alkyl and aryl moieties thereof being optionally halogenated, R can be alkyl or aryl, also optionally halogenated and m/n is approximately 2. In the above formula R' can be —OR'. As will be apparent to the person in the art, the first depicted formula shows some end groups which might not be present and covers those structures formed when excess $(RO)_3P=O$ or $(RO)_2P(O)R'$ is used relative to the phosphorus pentoxide. The second formula covers the structure when a one to one ratio is used. Such a structure can be either linear or cyclic. When n is 3, it is possible that a ring structure exists. In any case, it is contemplated that cyclic as well as linear anhydrides and mixtures thereof are intended to be covered. Representative phosphorus compounds which can be used as a reactant with the phosphorus pentoxide include the trialkyl phosphates or phosphonates. Such anhydride materials are substantially totally esterified materials containing only very low or trace amounts of free P—OH groups.

Representative phosphoric and phosphonic esters which can be used as reactants with phosphorus pentoxide to make the anhydride curing agents described herein include: triphenyl phosphate, diphenyl isopropylphenyl phosphate, diphenyl t-butylphenyl phosphate, tris(2,4-dibromophenyl) phosphate, tricresyl phosphate, triethyl phosphate, tributyl phosphate, methyl diphenyl phosphate, dimethyl methylphosphonate, diethyl ethylphosphonate, diphenyl methylphosphonate, and diphenyl phenylphosphonate.

The instant invention relies upon the use of such anhydride materials as curing agents for epoxy resins of the type well known to persons of ordinary skill in the art. These anhydride materials are coreactants with the epoxy resin and not mere catalysts. They become part of the polymer structure itself. Representative epoxy resins which can be selected for use can be found, for example, in The Encyclopedia of Polymer Science & Engineering, 2nd Ed., Wiley-Interscience, Vol. 6, pp. 322–338 and include the diglycidyl ether of bisphenol A, epoxy phenol novolac resins, epoxy cresol novolac resins, bisphenol F resin, the tetraglycidyl ether of tetrakis(4-hydroxyphenyl) ethane, triglycidyl-p-aminophenol, N,N,N',N'-tetraglycidyl-4,4'-diaminodiphenyl methane, triglycidyl isocyanurate, the diglycidyl ester of hexahydrophthalic acid, 3',4'-epoxycyclohexylmethyl-3,4-epoxycyclohexanecarboxylate, 3',4'-epoxycyclohexylmethyl-3,4-epoxycyclohexanecarboxylate, 3,4-epoxycyclohexyloxirane, 2-(3'-4'-epoxycyclohexyl)-5,1''-spiro-3'',4''-epoxycyclohexane-1,3-dioxane, bis(3,4- epoxy-cyclohexylmethyl) adipate and the like. Generally speaking, the amount of anhydride curing agent that is used can range from about 30% to about 100%, by weight of the epoxy resin, preferably from about 50% to about 100%, by weight of the epoxy resin. The epoxy resin composition can also include other materials conventionally used in such epoxy resin compositions, including inorganic fillers, supplementary hardeners (if desired), rubber modifying additives, and the like.

The epoxy resin and curing agent should preferably be well mixed to insure proper reaction (e.g., at temperatures from about −20° C. to 250° C. from about 30 seconds to 24 hours depending on the temperature). To complete any needed cure and achieve maximum hardness a postcure heating after the reaction exotherm has subsided may be useful.

The epoxy resin compositions of the present invention are deemed to be especially useful in environments where it is desired to flame retard the resulting cured resin. The polyphosphoric anhydride curing agent of the present invention becomes chemically bound in the resin and this chemically bound phosphorus moiety is especially useful in the flame retarding of the cured resin. In situations where the polyphosphoric anhydride repeating unit contains an alkyl substituent also containing halogen (e.g., chlorine), the presence of such an additional halo moiety can confer further flame retardancy on the system.

The cured epoxies are useful in those environments where other types of flame retardant epoxies would be useful: fire retardant coatings for normally flammable or heat-damagable substrates; in fire-retardant electrical components; in fire-resistant composite materials, and the like.

The Examples which follow further illustrate the present invention.

EXAMPLE 1

A curing agent was prepared by condensing 99.3 grams of dimethyl methylphosphonate with 82.0 grams of phosphorus pentoxide to yield a mobile clear liquid. The curing agent (20.3 grams) was mixed then with the epoxy resin (22.4 grams) at room temperature. The epoxy resin used was ARALDITE GY6010 epoxy resin from Ciba-Geigy Corporation. The mixture increased in temperature to 108° C. over eleven minutes and then began to drop in temperature at a somewhat slower rate. The mixture initially became less viscous as the temperature rose to about 50° C. and then began to thicken as epoxide condensation became dominant. The mixture was held at 85° C. for sixteen hours to give a very tough, cured resin.

EXAMPLE 2

The curing agent used in this Example was the clear, viscous liquid reaction product of 0.469 mole of phosphorus pentoxide and 0.939 mole of tris-beta-chloropropyl phosphate. The curing agent (31 grams) and 62 grams of epoxy resin (ARALDITE GY6010 brand) were mixed at room temperature. Upon mixing, the temperature rose to 68° C. in three minutes and then the exotherm slowly subsided. After forty-eight hours of standing at room temperature the resulting semisolid was non-tacky but slightly soft. Two weeks of additional standing at room temperature resulted in a hard glassy, non-tacky transparent solid.

EXAMPLE 3

Fifty grams of the epoxy resin used in Examples 1 and 2 was mixed with 50 grams of the curing agent used in Example 2 at room temperature. Upon mixing, the temperature of the mixture rapidly rose to 85° C. within ninety seconds and leveled off at 88° C. within three minutes. The exotherm then slowly began to subside. After standing for twelve minutes the mixture had become slightly tacky and did not flow. Additional standing for forty-eight hours at room temperature yielded a hard, non-tacky glassy solid.

EXAMPLE 4

A curing agent (21.1 grams), prepared by condensing two moles of tris(1-chloro-2-propyl) phosphate (FYROL PCF from Akzo Chemicals) with one mole of $P_2O_5$, was mixed with 21.2 grams of 3,4-epoxy cyclohexylmethyl-3,4-epoxy cyclohexane carboxylate epoxy resin (ERL-4221 brand) at room temperature. The mixture increased in temperature to 76° C. within one minute and the exotherm levelled off. After standing at room temperature for twenty-four hours the resulting glassy solid was non-tacky but slightly soft. Further standing for an additional twenty-four hours produced a hard non-tacky glassy solid.

It is also deemed that in like manner, a curing agent can be formed by reaction of tris(2-chloroethyl) phosphate, available as FYROL CEF from Akzo Chemicals Inc., and $P_2O_5$.

EXAMPLE 5

The curing agent (21.2 grams used in Example 4 was mixed with 14.2 grams of the epoxy resin used in Example 4 at room temperature. Upon mixing, the temperature rose rapidly to 82° C. within one minute. Further standing for one hour produced a hard, brittle, non-tacky glassy solid.

The foregoing Examples have been presented for illustrative purposes only and should not be construed in a limiting sense. The scope of protection that is sought is set forth in the claims which follow.

We claim:

1. A curable epoxy resin composition which comprises a curable epoxy resin and an effective amount for curing of a polyphosphoric/polyphosphonic anhydride curing agent.

2. A composition as claimed in claim 1 wherein the curing agent is present at from about 30% to about 100%, by weight of the epoxy resin.

3. A composition as claimed in claim 1 wherein the curing agent is the reaction product of phosphorus pentoxide and a phosphonate or a phosphate.

4. A composition as claimed in claim 1 wherein the amount of curing agent ranges from about 50% to about 100%, by weight of the epoxy resin.

5. A composition as claimed in claim 4 wherein the curing agent is the reaction product of phosphorus pentoxide and a phosphonate or a phosphate.

6. A composition as claimed in claim 4 wherein the curing agent is the reaction product of phosphorus pentoxide and dimethyl methylphosphonate.

7. A composition as claimed in claim 4 wherein the curing agent is the reaction product of phosphorus pentoxide and tris-beta-chloropropyl phosphate.

8. A composition as claimed in claim 4 wherein the curing agent is the reaction product of phosphorus pentoxide and tris(2-chloroethyl) phosphate.

* * * * *